UNITED STATES PATENT OFFICE.

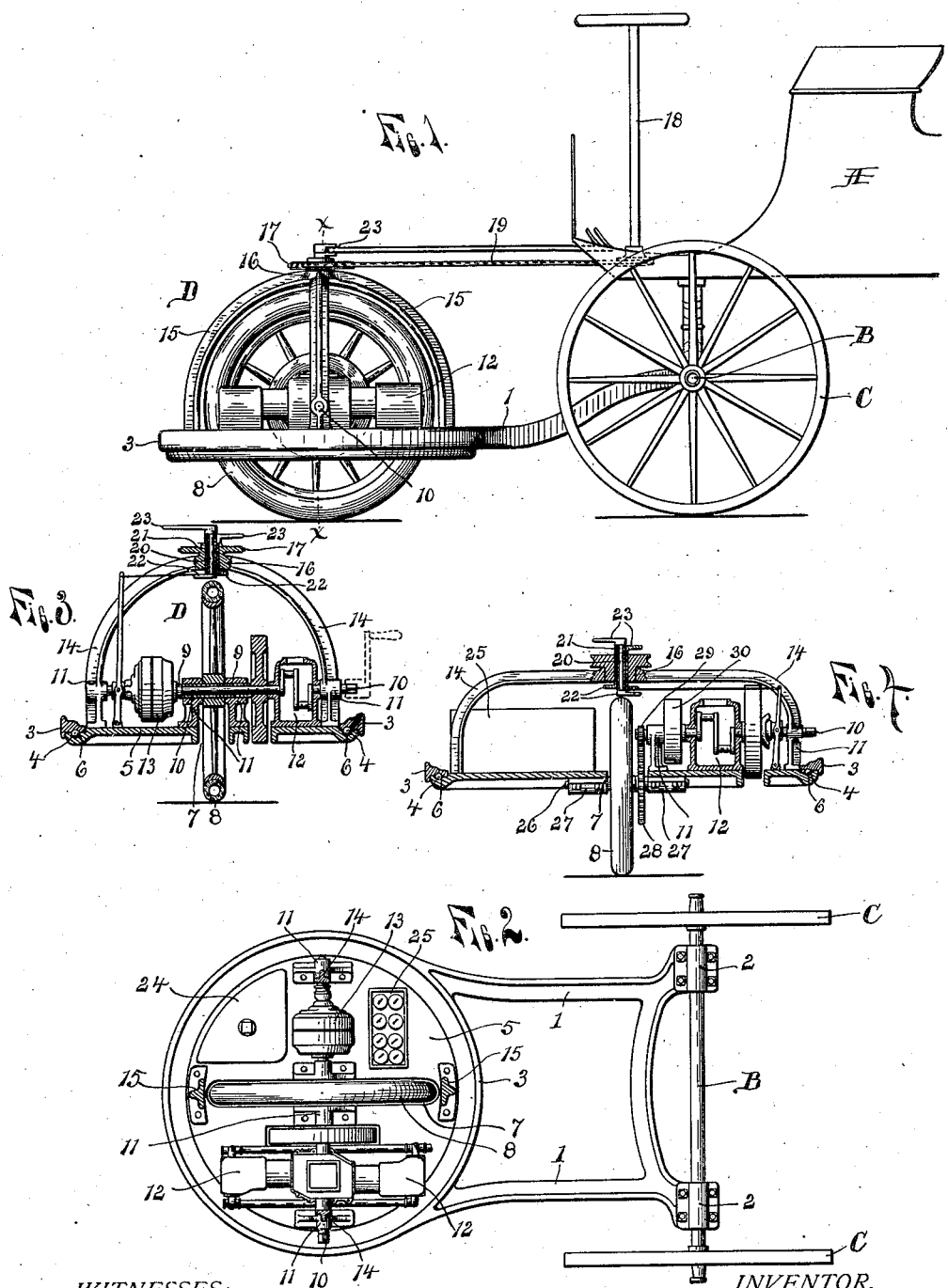

JOHN D. R. LAMSON, OF TOLEDO, OHIO.

MOTOR-VEHICLE.

No. 852,884.  Specification of Letters Patent.  Patented May 7, 1907.

Application filed December 28, 1905. Serial No. 293,551.

*To all whom it may concern:*

Be it known that I, JOHN D. R. LAMSON, a citizen of the United States of America, residing at Toledo, in the county of Lucas and State of Ohio, have invented certain new and useful Improvements in Motor-Vehicles, of which the following is a specification, reference being had therein to the accompanying drawings.

This invention relates to improvements in motor vehicles or more especially to a traction truck adapted to be attached to any vehicle to propel the same; and its object is to provide a self-contained, independent motor attachment for vehicles the direction of travel of which may be changed at will independently of the vehicle to turn said vehicle, the motor, transmission gear, batteries, tanks and all other parts necessary for power generation and transmission being supported by the traction wheel to turn therewith independently of the vehicle when the wheel is turned laterally to change its course.

A further object of the invention is to so construct the truck as to adapt it to be readily attached to or detached from any vehicle as ordinarily constructed and to also provide the device with certain other new and useful features in the construction, arrangement and combination of parts, all as hereinafter more fully described, reference being had to the accompanying drawing, in which Figure 1, is a side elevation of a device embodying the invention and showing the same attached to a vehicle; Fig. 2, a plan view of the same; Fig. 3, a section on the line *x—x* of Fig. 1; and Fig. 4, a similar section of a modified construction.

As shown in the drawings, A is a vehicle of the horse drawn type as ordinarily constructed, with a front pivoted axle B having front supporting wheels C, and D is the traction truck forming the subject of this invention, the frame 1 of which is pivotally attached at its rear end at 2 to said axle near each wheel. The forward portion of the frame 1 is formed with a circular opening or in the shape of a ring 3 provided with a ball groove 4 and 5 is a turn-table fitting the opening in the ring and also formed with a ball groove, the ring being supported upon the balls 6 in said grooves.

In the axis of the turn-table is a slot or opening 7 for the traction wheel 8 which is secured upon a sleeve 9 on the engine or driving shaft 10, said sleeve and shaft being mounted in bearings 11 bolted to the turn-table, and 12 is a gasolene engine of the horizontal double opposed cylinder type with its cranks forming a part of said shaft 10, said engine being also firmly bolted in place upon the turn-table. Upon the sleeve 9 and shaft 10 at the opposite side of the traction wheel, is the planetary transmission 13 for transmitting motion at variable speeds from the engine shaft to said sleeve upon which the traction wheel is mounted.

14 is an arch, cast integral with or otherwise secured at its ends to the outer bearings 11 and extending upward over the traction wheel, and a similar arch 15 is bolted at its lower ends to the turn-table and extends upward at right angles to the arch 14, said arches together forming a double arch or support with a head 16 at the meeting of said arches to which head a sprocket or other suitable wheel 17 is rigidly secured in the vertical center line of the turn-table, directly over the center of the traction wheel.

A steering post 18 is provided with a hand wheel at its upper end and is mounted in a suitable bearing on the floor of the vehicle body at its lower end. A sprocket or other suitable wheel is secured to the lower end of the post and a sprocket chain or cable 19 engages said wheel and the wheel 17 to transmit motion from the steering post to turn the turn-table and thus vary the direction of travel of the traction wheel.

A vertical opening is formed in the head 16 and attached sprocket, to receive a vertical shaft 20 and one or more tubes 21 sleeved on said shaft. The shaft and tubes turn freely in the opening and also relatively, and each is provided with a suitable arm 22 on its lower projecting end connected in any suitable manner to a lever or other part to be moved, to operate the transmission gear and control the operation of the engine or other parts. The upper ends of the tubes and shaft are provided with arms 23 which are connected in any desired manner with foot operated levers or other devices within easy reach of the driver.

A supply tank 24 and batteries 25 as well as all other necessary means for the generation and transmission of power are carried by the turn-table so that said table may be freely turned to change the direction of the traction wheel which also forms the steering or guide wheel and so that the wheel will at the same time be driven directly by the engine. By locating the operating shaft 20 and tubes 21 in the line of the vertical axis of the table and wheel, the connections do not interfere with the free turning of the table, and the pivoted attachment of the truck frame 1 to the vehicle axle permits the vertical movement of the truck independently of the vehicle which is thus drawn in the same manner as by a horse.

In the modified construction shown in Fig. 4, the traction wheel is mounted upon a shaft 26 rotatable in bearings 27 secured to the under side of the turn-table and is driven by a large gear 28 secured on said shaft and in mesh with a small gear 29 on the end of the transmission shaft, the transmission gear 30 and engine being both located at the same side of the traction wheel.

As ordinarily constructed the transmission gearing may have two or more speeds ahead and a reverse, but it is evident that the motion of the vehicle may be reversed by turning the turn table half way round, this movement being permitted, as the engine, driving mechanism and parts are all mounted on the turn-table to turn therewith and the steering is accomplished by turning said table with a continuous chain. It is also evident that two traction wheels may be employed if desired without departing from the spirit of the invention, which is to connect the motor directly to said wheel or wheels to actuate the same and to turn therewith, so that the traction wheel or wheels may also serve as the guide or steering wheel or wheels of the vehicle.

Having thus fully described my invention, what I claim is:—

1. The combination of a frame adapted to be pivotally attached at one end to a vehicle, a horizontally extending turn table to support the opposite end of said frame having an opening in its center, a traction wheel supporting said turn table and projecting through the opening therein, a motor upon the turn-table at one side of said wheel, power transmitting means secured to the turn-table and adapted to transmit motion at various speeds to the wheel, an arch secured at its ends to the turn-table and extending upward and over the wheel and motor, means for controlling the operation of said transmission means supported by said arch at its center in the vertical axial line of the table and means for turning the table attached to said arch at its center above the wheel to turn upon the same axis as the table.

2. The combination of a frame formed with a ring-shaped portion at one end, means for pivotally attaching the opposite end of said frame to a vehicle axle, a turn-table within said ring and a slot in its axis, bearings on said table, a shaft in said bearings, a traction wheel on said shaft, projecting through the slot in the table, a motor secured to the table and connected to the wheel shaft to actuate the same, an arch secured at its ends to the table and extending upward over the wheel, a wheel secured to said arch in the vertical axial line of the table, and means engaging said wheel for turning the table.

3. The combination of a frame formed with a ring-shaped portion at one end, means for pivotally attaching the opposite end of said frame to a vehicle axle, a turn-table within said ring to support the same and formed with an axial slot, bearings on said table, a shaft in said bearings extending diametrically across the table, a traction wheel on said shaft projecting through the slot in the table, a gasolene engine secured to the table at one side of the wheel and direct connected to the shaft, a gasolene tank on the table at the other side of the wheel to supply gasolene to the engine, a transmission gear supported by the table to transmit variable speeds to the wheel from the motor, controlling means for said motor and transmission, a double arch secured to the table and meeting in a head having a vertical opening in the vertical axial line of the table, means in said opening for operating said controlling means, a sprocket secured to said head on the arch, and a chain engaging said sprocket to turn the turn-table.

In testimony whereof I affix my signature in presence of two witnesses.

JOHN D. R. LAMSON.

Witnesses:
EDWARD H. RHOADES, Jr.,
JOHN D. RHOADES.